(12) United States Patent
Kato

(10) Patent No.: US 10,788,816 B2
(45) Date of Patent: Sep. 29, 2020

(54) PRODUCTION MANAGEMENT METHOD, PRODUCTION MANAGEMENT SYSTEM, AND PROGRAM

(71) Applicant: TOYOTA JIDOSHA KABUSHIKI KAISHA, Toyota-shi (JP)

(72) Inventor: Jun Kato, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/220,076

(22) Filed: Dec. 14, 2018

(65) Prior Publication Data

US 2019/0243347 A1 Aug. 8, 2019

(30) Foreign Application Priority Data

Feb. 6, 2018 (JP) .................................. 2018-019615

(51) Int. Cl.
| | |
|---|---|
| *G05B 19/418* | (2006.01) |
| *G06Q 10/06* | (2012.01) |
| *G06F 17/11* | (2006.01) |
| *G06Q 50/04* | (2012.01) |

(52) U.S. Cl.
CPC ........ *G05B 19/41865* (2013.01); *G06F 17/11* (2013.01); *G06Q 10/06* (2013.01); *G06Q 50/04* (2013.01); *G05B 2219/32015* (2013.01); *G05B 2219/32266* (2013.01); *G05B 2219/32323* (2013.01)

(58) Field of Classification Search
None
See application file for complete search history.

(56) References Cited

U.S. PATENT DOCUMENTS 7,991,593 B2 * 8/2011 Olsen .................... G06Q 10/04
703/2
2013/0297367 A1 * 11/2013 Baramov ......... G06Q 10/06312
705/7.22

FOREIGN PATENT DOCUMENTS

JP 9-225786 9/1997
JP 7-68788 4/2017

* cited by examiner

*Primary Examiner* — Sean Shechtman
(74) *Attorney, Agent, or Firm* — Oblon, McClelland, Maier & Neustadt, L.L.P.

(57) ABSTRACT

A production management method capable of deriving more optimal production numbers in which a pre-adjustment order is taken into account is provided. The production management method includes: reading a pre-adjustment order, constraints for a plurality of respective options, and a priority order of the constraints for the plurality of respective options; setting a target function of a quadratic programming problem; performing an optimization calculation of the quadratic programming problem for assigning an upper limit exceeding number in order starting from the one of the plurality of options whose priority order of the constraints is the highest; and performing, after the whole optimization calculation of the quadratic programming problem for assigning the upper limit exceeding number is completed, an optimization calculation of the quadratic programming problem for assigning the production numbers of the plurality of optional specifications, thereby determining the production numbers of the plurality of respective optional specifications.

6 Claims, 11 Drawing Sheets

| LARGE CLASSIFICATION | PRODUCTION NUMBER (FIXED VALUE) | OP SPECIFICATION | PRE-ADJUSTMENT ORDER | POST-ADJUSTMENT ORDER | OPTION 1 (AUDIO SYSTEM MANUFACTURED BY A COMPANY) | OPTION 2 (AUDIO SYSTEM MANUFACTURED BY B COMPANY) | OPTION 3 (MOON ROOF) | OPTION 4 (LEATHER SHEET) | OPTION 5 (fab SHEET) |
|---|---|---|---|---|---|---|---|---|---|
| GROUP 1 | 100 | OP SPECIFICATION 1 | P1=70 | ×1 | ● | | | ● | |
| | | OP SPECIFICATION 2 | P2=30 | ×2 | ● | | | | ● |
| GROUP 2 | 150 | OP SPECIFICATION 3 | P3=30 | ×3 | ● | | ● | | ● |
| | | OP SPECIFICATION 4 | P4=100 | ×4 | | ● | ● | | |
| | | OP SPECIFICATION 5 | P5=20 | ×5 | | ● | | ● | |
| | | | | UPPER LIMIT | 180 | 80 | 45 | 180 | 50 |

Fig. 2

| LARGE CLASSIFICATION | PRODUCTION NUMBER (FIXED VALUE) | OP SPECIFICATION | PRE-ADJUSTMENT ORDER | POST-ADJUSTMENT ORDER | OPTION 1 (AUDIO SYSTEM MANUFACTURED BY A COMPANY) | OPTION 2 (AUDIO SYSTEM MANUFACTURED BY B COMPANY) | OPTION 3 (MOON ROOF) | OPTION 4 (LEATHER SHEET) | OPTION 5 (fab SHEET) |
|---|---|---|---|---|---|---|---|---|---|
| GROUP 1 | 100 | OP SPECIFICATION 1 | P1=70 | ×1 | ● | | | | |
| | | OP SPECIFICATION 2 | P2=30 | ×2 | ● | | | | ● |
| GROUP 2 | 150 | OP SPECIFICATION 3 | P3=30 | ×3 | ● | ● | ● | | ● |
| | | OP SPECIFICATION 4 | P4=100 | ×4 | | | ● | ● | |
| | | OP SPECIFICATION 5 | P5=20 | ×5 | | ● | | ● | |
| | | | | UPPER LIMIT | ua1=180 | ud1=80 | ub1=45 | ub2=180 | uc1=50 |
| | | | | UPPER LIMIT EXCEEDING NUMBER | ya1 | yd1 | yb1 | yb2 | yc1 |
| | | | | PRIORITY ORDER | 1 | 0 | 2 | 2 | 3 |
| | | | | REQUIRED NUMBER WITH RESPECT TO PRE-ADJUSTMENT ORDER | 200 | 50 | 60 | 190 | 60 |

Fig. 3

| LARGE CLASSIFICATION | PRODUCTION NUMBER (FIXED VALUE) | OP SPECIFICATION | PRE-ADJUSTMENT ORDER | POST-ADJUSTMENT ORDER | OPTION 1 (AUDIO SYSTEM MANUFACTURED BY A COMPANY) | OPTION 2 (AUDIO SYSTEM MANUFACTURED BY B COMPANY) | OPTION 3 (MOON ROOF) | OPTION 4 (LEATHER SHEET) | OPTION 5 (fab SHEET) |
|---|---|---|---|---|---|---|---|---|---|
| GROUP 1 | 100 | OP SPECIFICATION 1 | P1=70 | ×1 | ● | | | ● | |
| | | OP SPECIFICATION 2 | P2=30 | ×2 | ● | | | | ● |
| GROUP 2 | 150 | OP SPECIFICATION 3 | P3=30 | ×3 | ● | ● | ● | | ● |
| | | OP SPECIFICATION 4 | P4=100 | ×4 | | | ● | ● | |
| | | OP SPECIFICATION 5 | P5=20 | ×5 | | ● | | ● | |
| | | | | UPPER LIMIT | ua1=180 | ud1=80 | ub1=45 | ub2=180 | uc1=50 |
| | | | | UPPER LIMIT EXCEEDING NUMBER | 0 | yd1 | yb1 | yb2 | yc1 |
| | | | | PRIORITY ORDER | 1 | 0 | 2 | 2 | 3 |
| | | | | REQUIRED NUMBER WITH RESPECT TO PRE-ADJUSTMENT ORDER | 200 | 50 | 60 | 190 | 60 |

Fig. 4

| LARGE CLASSIFICATION | PRODUCTION NUMBER (FIXED VALUE) | OP SPECIFICATION | PRE-ADJUSTMENT ORDER | POST-ADJUSTMENT ORDER | OPTION 1 (AUDIO SYSTEM MANUFACTURED BY A COMPANY) | OPTION 2 (AUDIO SYSTEM MANUFACTURED BY B COMPANY) | OPTION 3 (MOON ROOF) | OPTION 4 (LEATHER SHEET) | OPTION 5 (fab SHEET) |
|---|---|---|---|---|---|---|---|---|---|
| GROUP 1 | 100 | OP SPECIFICATION 1 | P1=70 | ×1 | ● | | | ● | |
| | | OP SPECIFICATION 2 | P2=30 | ×2 | ● | | | | ● |
| GROUP 2 | 150 | OP SPECIFICATION 3 | P3=30 | ×3 | ● | ● | ● | | ● |
| | | OP SPECIFICATION 4 | P4=100 | ×4 | | | ● | ● | |
| | | OP SPECIFICATION 5 | P5=20 | ×5 | | ● | | ● | |
| UPPER LIMIT | | | | | ua1=180 | ud1=80 | ub1=45 | ub2=180 | uc1=50 |
| UPPER LIMIT EXCEEDING NUMBER | | | | | 0 | yd1 | 5 | 20 | yc1 |
| PRIORITY ORDER | | | | | 1 | 0 | 2 | 2 | 3 |
| REQUIRED NUMBER WITH RESPECT TO PRE-ADJUSTMENT ORDER | | | | | 200 | 50 | 60 | 190 | 60 |

Fig. 5

| LARGE CLASSIFICATION | PRODUCTION NUMBER (FIXED VALUE) | OP SPECIFICATION | PRE-ADJUSTMENT ORDER | POST-ADJUSTMENT ORDER | OPTION 1 (AUDIO SYSTEM MANUFACTURED BY A COMPANY) | OPTION 2 (AUDIO SYSTEM MANUFACTURED BY B COMPANY) | OPTION 3 (MOON ROOF) | OPTION 4 (LEATHER SHEET) | OPTION 5 (fab SHEET) |
|---|---|---|---|---|---|---|---|---|---|
| GROUP 1 | 100 | OP SPECIFICATION 1 | P1=70 | ×1 | ● | | | | |
| | | OP SPECIFICATION 2 | P2=30 | ×2 | ● | | | | ● |
| GROUP 2 | 150 | OP SPECIFICATION 3 | P3=30 | ×3 | | ● | ● | | ● |
| | | OP SPECIFICATION 4 | P4=100 | ×4 | ● | | | ● | |
| | | OP SPECIFICATION 5 | P5=20 | ×5 | | ● | | ● | |
| UPPER LIMIT | | | | | ua1=180 | ud1=80 | ub1=45 | ub2=180 | uc1=50 |
| UPPER LIMIT EXCEEDING NUMBER | | | | | 0 | yd1 | 5 | 20 | 0 |
| PRIORITY ORDER | | | | | 1 | 0 | 2 | 2 | 3 |
| REQUIRED NUMBER WITH RESPECT TO PRE-ADJUSTMENT ORDER | | | | | 200 | 50 | 60 | 190 | 60 |

Fig. 6

| LARGE CLASSIFICATION | PRODUCTION NUMBER (FIXED VALUE) | OP SPECIFICATION | PRE-ADJUSTMENT ORDER | POST-ADJUSTMENT ORDER | OPTION 1 (AUDIO SYSTEM MANUFACTURED BY A COMPANY) | OPTION 2 (AUDIO SYSTEM MANUFACTURED BY B COMPANY) | OPTION 3 (MOON ROOF) | OPTION 4 (LEATHER SHEET) | OPTION 5 (fab SHEET) |
|---|---|---|---|---|---|---|---|---|---|
| GROUP 1 | 100 | OP SPECIFICATION 1 | P1=70 | ×1 | ● | | | | |
| | | OP SPECIFICATION 2 | P2=30 | ×2 | ● | | | | ● |
| GROUP 2 | 150 | OP SPECIFICATION 3 | P3=30 | ×3 | | ● | ● | | ● |
| | | OP SPECIFICATION 4 | P4=100 | ×4 | ● | | | ● | |
| | | OP SPECIFICATION 5 | P5=20 | ×5 | | ● | ● | ● | |
| | | | | UPPER LIMIT | ua1=180 | ud1=80 | ub1=45 | ub2=180 | uc1=50 |
| | | | | UPPER LIMIT EXCEEDING NUMBER | 0 | 0 | 5 | 20 | 0 |
| | | | | PRIORITY ORDER | 1 | 0 | 2 | 2 | 3 |
| | | | | REQUIRED NUMBER WITH RESPECT TO PRE-ADJUSTMENT ORDER | 200 | 50 | 60 | 190 | 60 |

Fig. 7

| LARGE CLASSIFICATION | PRODUCTION NUMBER (FIXED VALUE) | OP SPECIFICATION | PRE-ADJUSTMENT ORDER | POST-ADJUSTMENT ORDER | OPTION 1 (AUDIO SYSTEM MANUFACTURED BY A COMPANY) | OPTION 2 (AUDIO SYSTEM MANUFACTURED BY B COMPANY) | OPTION 3 (MOON ROOF) | OPTION 4 (LEATHER SHEET) | OPTION 5 (fab SHEET) |
|---|---|---|---|---|---|---|---|---|---|
| GROUP 1 | 100 | OP SPECIFICATION 1 | P1=70 | x1=84 | ● | | | | |
| | | OP SPECIFICATION 2 | P2=30 | x2=16 | ● | | | | ● |
| GROUP 2 | 150 | OP SPECIFICATION 3 | P3=30 | x3=34 | ● | ● | ● | | ● |
| | | OP SPECIFICATION 4 | P4=100 | x4=80 | | | | ● | |
| | | OP SPECIFICATION 5 | P5=20 | x5=36 | | ● | | ● | |
| | | | | UPPER LIMIT | ua1=180 | ud1=80 | ub1=45 | ub2=180 | uc1=50 |
| | | | | UPPER LIMIT EXCEEDING NUMBER | 0 | 0 | 5 | 20 | 0 |
| | | | | PRIORITY ORDER | 1 | 0 | 2 | 2 | 3 |
| | | | | REQUIRED NUMBER WITH RESPECT TO PRE-ADJUSTMENT ORDER | 200 | 50 | 60 | 190 | 60 |

Fig. 8

| LARGE CLASSIFICATION | PRODUCTION NUMBER (FIXED VALUE) | OP SPECIFICATION | PRE-ADJUSTMENT ORDER | OPTION 1 (AUDIO SYSTEM MANUFACTURED BY A COMPANY) | OPTION 2 (AUDIO SYSTEM MANUFACTURED BY B COMPANY) | OPTION 3 (MOON ROOF) | OPTION 4 (LEATHER SHEET) |
|---|---|---|---|---|---|---|---|
| GROUP 1 | 100 | OP SPECIFICATION 1 | P1=70 | ● | | | ● |
| | | OP SPECIFICATION 2 | P2=30 | ● | | ● | |
| GROUP 2 | 150 | OP SPECIFICATION 3 | P3=30 | | ● | ● | |
| | | OP SPECIFICATION 4 | P4=100 | ● | | | ● |
| | | OP SPECIFICATION 5 | P5=20 | | ● | | ● |
| UPPER LIMIT | | | | ua1=180 | ud1=80 | ub1=45 | ub2=180 |
| UPPER LIMIT EXCEEDING NUMBER | | | | 0 | 0 | 5 | 20 |
| PRIORITY ORDER | | | | 1 | 0 | 2 | 2 |
| REQUIRED NUMBER WITH RESPECT TO PRE-ADJUSTMENT ORDER | | | | 200 | 50 | 60 | 190 |

Fig. 9A

| OPTION 5 (fab SHEET) | EXPRESSION (5) WITH PROPORTIONAL DIVISION | | EXPRESSION (6) WITHOUT PROPORTIONAL DIVISION | |
|---|---|---|---|---|
| | POST-ADJUSTMENT ORDER | DIFFERENCE BETWEEN PRE-ADJUSTMENT ORDER AND POST-ADJUSTMENT ORDER | POST-ADJUSTMENT ORDER | DIFFERENCE BETWEEN PRE-ADJUSTMENT ORDER AND POST-ADJUSTMENT ORDER |
| | x1=84 | +14 | x1=80 | +10 |
| ● | x2=16 | −14 | x2=20 | −10 |
| ● | x3=34 | +4 | x3=30 | 0 |
| | x4=80 | −20 | x4=80 | −20 |
| | x5=36 | +16 | x5=40 | +20 |
| uc1=50 | TOTAL ABSOLUTE VALUE | 68 | TOTAL ABSOLUTE VALUE | 60 |
| 0 | | | | |
| 3 | | | | |
| 60 | | | | |

PRODUCTION MANAGEMENT METHOD, PRODUCTION MANAGEMENT SYSTEM, AND PROGRAM

CROSS REFERENCE TO RELATED APPLICATIONS

This application is based upon and claims the benefit of priority from Japanese patent application No. 2018-019615, filed on Feb. 6, 2018, the disclosure of which is incorporated herein in its entirety by reference.

BACKGROUND

The present disclosure relates to a production management method, a production management system, and a program.

A production management method that supports production planning has been known. For example, Japanese Unexamined Patent Application Publication No. H09-225786 discloses a production management method that visualizes a load situation of a production line and reduces an uneven load. Further, Japanese Unexamined Patent Application Publication No. 2017-068788 discloses a production management method that gives a priority of constraints in each index as a weight, expresses a target function (an evaluation function) by a linear weighted sum of this weight, and calculates, by a mathematical planning method, a solution when this linear weighted sum is minimized. The aim of Japanese Unexamined Patent Application Publication No. 2017-068788 is to make a steelmaking rolling plan, in which an index is a production type and a solution obtained by a calculation is a frame to be applied per product type.

SUMMARY

In a case of production of products such as automobiles having a large variety of types, production planning needs to be made in view of not only a large classification by types of products but also a small classification such as a type or a grade of the option to be selected. Therefore, in the case of the production of products having a large variety of types, it is impossible to derive optimal production numbers by simply visualizing the load like in the production planning system disclosed in Japanese Unexamined Patent Application Publication No. H09-225786.

Further, in the case of the production of products having a large variety of types, in the production planning, the aforementioned small classification needs to be indices (options), and a solution needs to be calculated in view of the constraints of them. In the production management method disclosed in Japanese Unexamined Patent Application Publication No. 2017-068788, however, it is difficult to give a quantitative weight to the priority of the constraints in a large number of options. Therefore, in the case of the production of products having a large variety of types, in the calculation method disclosed in Japanese Unexamined Patent Application Publication No. 2017-068788, it is possible that the resulting solution may not be optimal.

Further, in the production of products having a large variety of types, information (pre-adjustment order) regarding the desired number for each specification indicating the breakdown regarding desired numbers of the respective optional specifications may be presented by a dealer or the like. The optional specification is a pattern regarding which one of a plurality of options will be selected, that is, a combination pattern of the options. In this case, in the calculation method disclosed in Japanese Unexamined Patent Application Publication No. 2017-068788, the linear weighted sum that uses the priority of the constraints in each option as a weight is only minimized. Therefore, as a matter of course, it is impossible to perform a calculation in which the breakdown of the allocated numbers of the respective optional specifications indicated by the aforementioned pre-adjustment order is taken into account.

The present disclosure has been made in view of the aforementioned circumstances and aims to provide a production management method capable of deriving more optimal production numbers in which the pre-adjustment order is taken into account.

The present disclosure is a production management method for performing assignment of production numbers of a plurality of optional specifications, which are combination patterns of a plurality of options, using upper limits in the plurality of respective options as constraints, while maintaining a production number in a group included in a large classification, the method including:

reading a pre-adjustment order as a desired breakdown of the plurality of optional specifications, constraints for the plurality of respective options, and a priority order of the constraints for the plurality of respective options;

setting, for options whose respective priority orders of the constraints are the same, a target function of a quadratic programming problem for assigning an upper limit exceeding number, which is a number where an allocated number for each option exceeds the upper limit of this option, and setting a target function of a quadratic programming problem for assigning the production numbers of the plurality of optional specifications based on the information that has been read;

performing an optimization calculation of the quadratic programming problem for assigning the upper limit exceeding number in order starting from the one of the plurality of options whose priority order of the constraints is the highest, thereby determining the upper limit exceeding number of this option; and performing, after the whole optimization calculation of the quadratic programming problem for assigning the upper limit exceeding number is completed, an optimization calculation of the quadratic programming problem for assigning the production numbers of the plurality of optional specifications, thereby determining the production numbers of the plurality of respective optional specifications, in which the target function of the quadratic programming problem for assigning the upper limit exceeding number for each of the options whose respective priority orders of the constraints are the same is a sum total of values obtained by dividing the square of the upper limit exceeding number by an upper limit in the options whose respective priority orders of the constraints are the same, and the target function of the quadratic programming problem for assigning the production numbers of the plurality of optional specifications is a sum total of values obtained by dividing the square of a difference between the assigned production number and the allocated number in the pre-adjustment order in each optional specification by the allocated number in the pre-adjustment order.

The priority order of the constraints is set for each of the options, and the values are determined in order starting from the option whose priority order of the constraints is the highest, whereby it is possible to perform control, for the option whose priority order of the constraints is high, in such a way that the allocated number does not exceed the upper limit. In the calculation of the upper limit exceeding number in the options whose respective priority orders of the constraints are the same, in the options whose respective priority orders of the constraints are the same, the upper limit exceeding number is proportionally divided based on the value of the upper limit of each option, whereby it is possible to level the upper limit exceeding number between the options whose respective priority orders of the constraints are the same. Then the exchange adjustment is further performed for an option having a large margin for the constraints, thereby determining the post-adjustment order. In the calculation in the post-adjustment order, the difference between the assigned number in the post-adjustment order and the allocated number in the pre-adjustment order in each optional specification is proportionally divided by the allocated number in the pre-adjustment order. It is therefore possible to derive more optimal production numbers in which the pre-adjustment order information is taken into account.

The present disclosure is a production management system for performing assignment of production numbers of a plurality of optional specifications, which are combination patterns of a plurality of options, using upper limits in the plurality of respective options as constraints, while maintaining a production number in a group included in a large classification, the system including:

an operation unit, a storage unit, and an input unit, in which the input unit reads a pre-adjustment order as a desired breakdown of the plurality of optional specifications, constraints for the plurality of respective options, and a priority order of the constraints for the plurality of respective options and causes the storage unit to store the information that has been read, the operation unit sets, for options whose respective priority orders of the constraints are the same, a target function of a quadratic programming problem for assigning an upper limit exceeding number, which is a number where an allocated number for each option exceeds the upper limit of this option, and sets a target function of a quadratic programming problem for assigning the production numbers of the plurality of optional specifications based on the information that has been read, the operation unit performs an optimization calculation of the quadratic programming problem for assigning the upper limit exceeding number in order starting from the one of the plurality of options whose priority order of the constraints is the highest, thereby determining the upper limit exceeding number of this option, the operation unit performs, after the whole optimization calculation of the quadratic programming problem for assigning the upper limit exceeding number is completed, an optimization calculation of the quadratic programming problem for assigning the production numbers of the plurality of optional specifications, thereby determining the production numbers of the plurality of respective optional specifications, the target function of the quadratic programming problem for assigning the upper limit exceeding number for each of the options whose respective priority orders of the constraints are the same is a sum total of values obtained by dividing the square of the upper limit exceeding number by an upper limit in the options whose respective priority orders of the constraints are the same, and the target function of the quadratic programming problem for assigning the production numbers of the plurality of optional specifications is a sum total of values obtained by dividing the square of a difference between the assigned production number and the allocated number in the pre-adjustment order in each optional specification by the allocated number in the pre-adjustment order. It is therefore possible to derive more optimal production numbers in which the pre-adjustment order information is taken into account.

The present disclosure is a program for causing a computer to execute a processing procedure for performing assignment of production numbers of a plurality of optional specifications, which are combination patterns of a plurality of options, using upper limits in the plurality of respective options as constraints, while maintaining a production number in a group included in a large classification, the processing procedure including:

reading a pre-adjustment order as a desired breakdown of the plurality of optional specifications, constraints for the plurality of respective options, and a priority order of the constraints for the plurality of respective options;

setting, for options whose respective priority orders of the constraints are the same, a target function of a quadratic programming problem for assigning an upper limit exceeding number, which is a number where an allocated number for each option exceeds the upper limit of this option, and setting a target function of a quadratic programming problem for assigning the production numbers of the plurality of optional specifications based on the information that has been read;

performing an optimization calculation of the quadratic programming problem for assigning the upper limit exceeding number in order starting from the one of the plurality of options whose priority order of the constraints is the highest, thereby determining the upper limit exceeding number of this option; and performing, after the whole optimization calculation of the quadratic programming problem for assigning the upper limit exceeding number is completed, an optimization calculation of the quadratic programming problem for assigning the production numbers of the plurality of optional specifications, thereby determining the production numbers of the plurality of respective optional specifications, in which the target function of the quadratic programming problem for assigning the upper limit exceeding number for each of the options whose respective priority orders of the constraints are the same is a sum total of values obtained by dividing the square of the upper limit exceeding number by an upper limit in the options whose respective priority orders of the constraints are the same, and the target function of the quadratic programming problem for assigning the production numbers of the plurality of optional specifications is a sum total of values obtained by dividing the square of a difference between the assigned production number and the allocated number in the pre-adjustment order in each optional specification by the allocated number in the pre-adjustment order. It is therefore possible to derive more optimal production numbers in which the pre-adjustment order information is taken into account.

According to the present disclosure, it is possible to derive more optimal production numbers in which the pre-adjustment order information is taken into account.

The above and other objects, features and advantages of the present disclosure will become more fully understood from the detailed description given hereinbelow and the

BRIEF DESCRIPTION OF DRAWINGS

FIG. 2 is a view showing one example of a correspondence table showing a pre-adjustment order and options in a production of automobiles read in Step S1 of FIG. 1;

FIG. 3 is a schematic view for describing setting of priority orders of constraints in the respective options;

FIG. 4 is a view for schematically describing an order for performing an optimization calculation of a quadratic programming problem in Steps S3 and S4 of FIG. 1;

FIG. 5 is a view for schematically describing the order for performing the optimization calculation of the quadratic programming problem in Steps S3 and S4 of FIG. 1;

FIG. 6 is a view for schematically describing the order for performing the optimization calculation of the quadratic programming problem in Steps S3 and S4 of FIG. 1;

FIG. 7 is a view for schematically describing the order for performing the optimization calculation of the quadratic programming problem in Steps S3 and S4 of FIG. 1;

FIG. 8 is a view for schematically describing the order for performing the optimization calculation of the quadratic programming problem in Steps S3 and S4 of FIG. 1;

FIG. 9A and FIG. 9B are comparison tables in which a case in which a difference between a post-adjustment order and a pre-adjustment order is proportionally divided based on the pre-adjustment order is compared with a case in which the difference between the post-adjustment order and the pre-adjustment order is not proportionally divided based on the pre-adjustment order in a target function for determining the post-adjustment order.

DESCRIPTION OF EMBODIMENTS

Hereinafter, with reference to the drawings, embodiments of the present disclosure will be explained. For the sake of clarification of the explanation, the following descriptions and the drawings are omitted and simplified as appropriate. Throughout the drawings, the same elements are denoted by the same reference symbols, and overlapping descriptions will be omitted as appropriate.

First Embodiment

A production management method according to a first embodiment performs exchange adjustment (assignment) of production numbers of optional specifications using upper limits (upper limit values) in a plurality of respective options as constraints while maintaining the production number in each group included in a large classification in production planning.

The groups included in the large classification are groups whose respective basic specifications as the large classification are the same. That the respective basic specifications are the same means that, in a case of production of automobiles, for example, the respective basic specifications such as the type of vehicles, the sales territory, the engine type, and the type of transmission are the same.

The options mean individual functions that can be selected. In the case of production of automobiles, for example, the options include, for example, an audio system manufactured by A company, an audio system manufactured by B company, a moon roof, a leather sheet, and a fab sheet. The constraints in the option mean the upper limit of the supplied number of this option. In the case of the example of the production of automobiles stated above, the upper limit of each option is 180 for the audio system manufactured by A company, 80 for the audio system manufactured by B company, 45 for the moon roof, 180 for the leather sheet, and 50 for the fab sheet.

The optional specification means a pattern regarding which one of the plurality of options will be selected, that is, a combination pattern of the options. The exchange adjustment of the production numbers means adjustment for changing only the assignment for each optional specification without changing the total number for each large classification.

Pre-adjustment order information is information regarding the desired number for each specification indicating the breakdown regarding desired numbers of the respective optional specifications presented by a dealer or the like.

Figure 1:
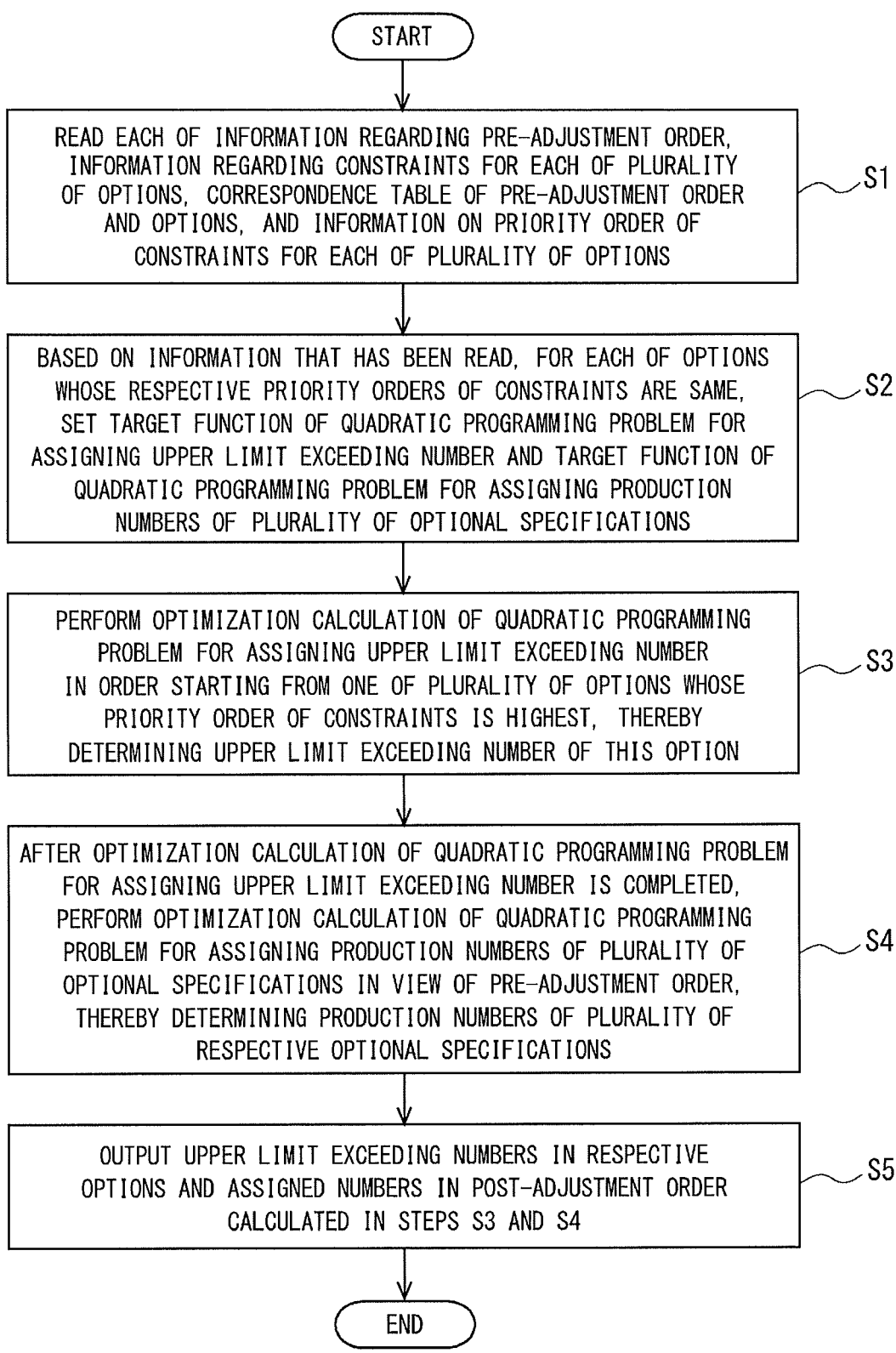
FIG. 1 is a flowchart showing an outline of processing of a production management method according to a first embodiment.

Referring first to FIG. 1, a flow of processing in a production management method according to this embodiment will be explained.

FIG. 1 is a flowchart showing an outline of processing of the production management method according to this embodiment. As shown in FIG. 1, first, information regarding the pre-adjustment order, information regarding the constraints for each of the plurality of options, a correspondence table of the pre-adjustment order and the options, and information on the priority order of the constraints for each of the plurality of options are each read (Step S1). Next, based on the information that has been read, for each of the options whose respective priority orders of the constraints are the same, a target function of a quadratic programming problem for assigning an upper limit exceeding number is set and a target function of a quadratic programming problem for assigning the production numbers of the plurality of optional specifications is set (Step S2). The upper limit exceeding number is an amount where the allocated number for each option exceeds the upper limit of this option. Further, the quadratic programming problem, which is one of mathematical optimization problems, is the one for optimizing a quadratic function formed of some variables under linear constraints.

After Step S2, an optimization calculation of the quadratic programming problem for assigning the upper limit exceeding number is performed in order starting from the one of the plurality of options whose priority order of the constraints is the highest, thereby determining the upper limit exceeding number of this option (Step S3). Next, after the optimization calculation of the quadratic programming problem for assigning the upper limit exceeding number is completed, the optimization calculation of the quadratic programming problem for assigning the production numbers of the plurality of optional specifications is performed in view of the pre-adjustment order, thereby determining the production numbers (the assigned numbers in a post-adjustment order) of the plurality of respective optional specifications (Step S4). These assigned numbers in the post-adjustment order are planned production numbers in the production planning. Then the upper limit exceeding numbers in the respective options and the assigned numbers in the post-adjustment order calculated in Steps S3 and S4 are output (Step S5).

An existing mathematical planning calculation solver can be used for the optimization calculation of the quadratic programming problem.

FIG. 2 is a view showing one example of a correspondence table showing the pre-adjustment order and the options in the production of automobiles read in Step S1 of FIG. 1. As shown in FIG. 2, the large classification includes two groups, that is, a group 1 and a group 2. The group 1 includes automobiles whose type is SUV, sales territory is North America, engine type is 1GR, type of transmission is CVT. The group 2 includes automobiles whose type is SUV, sales territory is North America, engine type is 1GR, type of transmission is MT. There are five options from the option 1 to the option 5. The option 1 is an audio system manufactured by A company, the option 2 is an audio system manufactured by B company, the option 3 is a moon roof, the option 4 is a leather sheet, and the option 5 is a fab sheet.

The production numbers in the respective groups in the large classification are 100 in the group 1 and 150 in the group 2. The production numbers in the respective groups in the large classification are fixed values, that is, definite values. The breakdown of the allocated numbers in the pre-adjustment order is, in the optional specification of the group 1, the number P1 of the OP specification 1 is 70, and the number P2 of the OP specification 2 is 30, and in the optional specification of the group 2, the number P3 of the OP specification 3 is 30, the number P4 of the OP specification 4 is 100, and the number P5 of the OP specification 5 is 20.

In the OP specification 1 in the group 1, the options 1 and 4 are selected. In the OP specification 2 in the group 1, the options 1, 3, and 5 are selected. In the OP specification 3 in the group 2, the options 2, 3, and 5 are selected. In the OP specification 4 in the group 2, the options 1 and 4 are selected. In the OP specification 5 in the group 2, the options 2 and 4 are selected. The upper limits as constraint conditions in the respective options are 180 in the option 1, 80 in the option 2, 45 in the option 3, 180 in the option 4, and 50 in the option 5.

Prior to the execution of the processing of the production management method according to this embodiment, the priority orders of the constraints in the respective options need to be set.

FIG. 3 is a schematic view for describing setting of the priority orders of the constraints in the respective options. Compared to the correspondence table shown in FIG. 2, the priority orders of the constraints in the respective options and the required number for the pre-adjustment order are further input in FIG. 3. As shown in FIG. 3, when the production numbers of the optional specifications in the pre-adjustment order have been produced, the required numbers of the respective options are 200 in the option 1, 50 in the option 2, 60 in the option 3, 190 in the option 4, and 60 in the option 5.

Regarding the priority orders of the constraints in the respective options, the highest priority is set to the first, following the second, the third, and the lowest priority is set to the zeroth. While the number of priority orders of the constraints in each option is set to four, i.e., 1, 2, 3, and 0, for the sake of convenience of explanation, this number is merely an example and it is sufficient that this number be two or larger. Further, there may be a plurality of options whose respective priority orders of the constraints are the same.

The priority orders of the constraints in the respective options are determined, in the actual operation, for example, based on a magnitude of a margin for the upper limit as the constraints with respect to the required number for the pre-adjustment order, and a magnitude of an adjustment margin for the upper limit etc. That is, when the upper limit is significantly smaller than the required number for the pre-adjustment order and there is little adjustment margin for the upper limit, this means that this option is not flexible. In this case, the priority order is made relatively high. On the other hand, when the upper limit is significantly greater than the required number for the pre-adjustment order or there is some adjustment margin for the upper limit, this means that this option is flexible to some extent. In this case, the priority order is made relatively low.

That is, in the actual operation, in the example shown in FIG. 3, while the required number of the option 2 is 50, the upper limit is 80. In this case, the upper limit is significantly greater than the required number for the pre-adjustment order. Therefore, the priority order of the option 2 is set to the lowest "priority order 0". On the other hand, in the option 1, the upper limit is significantly smaller than the required number for the pre-adjustment order and there is little adjustment margin for the upper limit. Therefore, the priority order of the option 1 is set to the highest "priority order 1".

As described above, when the allocated number of the option exceeds the upper limit and the required number of the option is smaller than the upper limit, the upper limit exceeding number is set to 0. The upper limit exceeding number and the assigned numbers of the respective optional specifications in the post-adjustment order are obtained by executing the processing of the production management method.

Next, the processing of the production management method according to this embodiment described with reference to FIG. 1 will be explained in more detail.

In Step S2 of FIG. 1, a target function of the quadratic programming problem for assigning the upper limit exceeding number for each of the options whose respective priority orders of the constraints are the same is set by the following Expressions (1) to (4). The solution is proportionally divided by setting the target function in this way, which can be proved using the method of Lagrange multiplier.

$$\sum_{i=1}^{NA} \frac{ya_i^2}{ua_i} \quad (1)$$

$$\sum_{i=1}^{NB} \frac{yb_i^2}{ub_i} \quad (2)$$

$$\sum_{i=1}^{NC} \frac{yc_i^2}{uc_i} \quad (3)$$

$$\sum_{i=1}^{ND} \frac{yd_i^2}{ud_i} \quad (4)$$

Expression (1) is a target function for determining the upper limit exceeding number for the options whose respective priority orders are 1. In Expression (1), $ya_i$ denotes the upper limit exceeding number of the option included in the priority order 1, $ua_i$ denotes the upper limit of this option, and NA denotes the number of options whose respective priority orders are the first. Expression (1) is the sum total of values obtained by dividing the square of the upper limit exceeding number $ya_i$ by the upper limit $ua_i$ in the options whose respective priority orders of the constraints are the same. That is, the upper limit exceeding number $ya_i$ in each of the options included in the priority order 1 is proportionally divided by the constraint $ua_i$ of each option.

Expression (2) is a target function for determining the upper limit exceeding number for the options whose respective priority orders are 2. In Expression (2), $yb_i$ denotes the upper limit exceeding number of the option included in the priority order 2, $ub_i$ denotes the upper limit of this option, NB denotes the number of options whose respective priority orders are the second. Expression (2) is the sum total of values obtained by dividing the square of the upper limit exceeding number $yb_i$ by the upper limit $ub_i$ in the options whose respective priority orders of the constraints are the same. That is, the upper limit exceeding number $yb_i$ in each of the options included in the priority order 1 is proportionally divided by the constraint $ub_i$ of each option.

Expression (3) is a target function for determining the upper limit exceeding number for the options whose respective priority orders are 3. In Expression (3), $yc_i$ denotes the upper limit exceeding number of the option included in the priority order 3, $uc_i$ denotes the upper limit of this option, and NC denotes the number of options whose respective priority orders are the third. Expression (3) is the sum total of values obtained by dividing the square of the upper limit exceeding number $yc_i$ by the upper limit $uc_i$ in the options whose respective priority orders of the constraints are the same. That is, the upper limit exceeding number $yc_i$ in each of the options included in the priority order 3 is proportionally divided by the constraint $uc_i$ of each option.

Expression (4) is a target function for determining the upper limit exceeding number for the options whose respective priority orders are 0. In Expression (4), $yd_i$ denotes the upper limit exceeding number of the option included in the priority order 0, $ud_i$ denotes the upper limit of this option, and ND denotes the number of options whose respective priority orders are the zeroth. Expression (4) the sum total of values obtained by dividing the square of the upper limit exceeding number $yd_i$ by the upper limit $ud_i$ in the options whose respective priority orders of the constraints are the same. That is, the upper limit exceeding number $yd_i$ in each of the options included in the priority order 0 is proportionally divided by the constraint $ud_i$ of each option.

In Step S2 of FIG. 1, the target function of the quadratic programming problem for assigning the production numbers of the plurality of optional specifications is set by the following expression.

$$\sum_{i=1}^{N} \frac{(p_i - x_i)^2}{p_i} \quad (5)$$

In Expression (5), $x_i$ denotes the assigned number in the post-adjustment order of the OP specification i, $P_i$ denotes the allocated number in the pre-adjustment order of the OP specification i, and N denotes the number of optional specifications. Expression (5) is the sum total of values obtained by dividing the square of the difference between the post-adjustment order xi, which is the assigned production number, and the allocated number Pi in the pre-adjustment order by the allocated number in the pre-adjustment order in each optional specification. That is, the difference between the assigned number xi in the post-adjustment order and the allocated number Pi in the pre-adjustment order is proportionally divided by the pre-adjustment order Pi.

As described above, in Step S3 of FIG. 1, the optimization calculation of the quadratic programming problem is performed starting from the one of the options whose priority order of the constraints is the highest. Here, the optimization calculation of the target function means minimization of the target function. FIGS. 4 to 8 are views for schematically describing an order for performing the optimization calculation of the quadratic programming problem in Steps S3 and S4 of FIG. 1. First, as shown in FIG. 4, the upper limit exceeding number of the option 1 included in the priority order 1 is determined. The number of options NA in Expression (1) is 1 (only the option 1). As a result of the optimization calculation using the target function in Expression (1), the upper limit exceeding number of the option 1 has become 0, and thus the upper limit exceeding number of the option 1 is determined to be 0.

Next, as shown in FIG. 5, the upper limit exceeding numbers of the options 3 and 4 included in the priority order 2 are determined. In a state in which the upper limit exceeding number of the option 1 is fixed to 0, the optimization calculation is performed using the target function in Expression (2). The number of options NB in Expression (2) is 2 (the option 3 and the option 4). As a result, since the upper limit exceeding number of the option 3 has become 5 and the upper limit exceeding number of the option 4 has become 20, the upper limit exceeding number of the option 3 is determined to be 5 and the upper limit exceeding number of the option 4 is determined to be 20.

Next, as shown in FIG. 6, the upper limit exceeding number of the option 5 included in the priority order 3 is determined. The number of options NC is 1 (only the option 5). In a state in which the upper limit exceeding number of the option 1 is fixed to 0, the upper limit exceeding number of the option 3 is fixed to 5, and the upper limit exceeding number of the option 4 is fixed to 20, the optimization calculation is performed using the target function in Expression (3). As a result, since the upper limit exceeding number of the option 5 has become 0, the upper limit exceeding number of the option 5 is determined to be 0.

Next, as shown in FIG. 7, the upper limit exceeding number of the option 2 included in the priority order 0 is determined. The number of options ND in Expression (4) is 1 (only the option 2). In a state in which the upper limit exceeding number of the option 1 is fixed to 0, the upper limit exceeding number of the option 3 is fixed to 5, the upper limit exceeding number of the option 4 is fixed to 20, and the upper limit exceeding number of the option 5 is fixed to 0, the optimization calculation is performed using the target function in Expression (4). As a result, since the upper limit exceeding number of the option 2 has become 0, the upper limit exceeding number of the option 2 is determined to be 0.

As described above, in Step S4 of FIG. 1, the optimization calculation of the quadratic programming problem for assigning the production numbers of the plurality of optional specifications is performed, thereby determining the production number in the post-adjustment order of the plurality of respective optional specifications. The number of optional specifications N in Expression (5) is 5 (OP specifications 1-5). As shown in FIG. 8, in a state in which the upper limit exceeding number of the option 1 is fixed to 0, the upper limit exceeding number of the option 2 is fixed to 0, the upper limit exceeding number of the option 3 is fixed to 5, the upper limit exceeding number of the option 4 is fixed to 20, and the upper limit exceeding number of the option 5 is fixed to 0, the optimization calculation is performed using the target function in Expression (5). As a result, in the optional specification of the group 1, the number x1 in the OP specification 1 has been calculated to be 84, and the number x2 in the OP specification 2 has been calculated to be 16. In the optional specification of the group 2, the number x3 in the OP specification 3 has been calculated to be 34, the number x4 in the OP specification 4 has been calculated to be 80, and the number x5 in the OP specification 5 has been calculated to be 36. These are the allocated numbers for the respective optional specifications in the post-adjustment order.

In this way, by performing the production planning according to the production management method of this embodiment, the proportion of the production numbers of the respective optional specifications in the post-adjustment order is proportionally divided based on the proportion of the production numbers of the respective optional specifications in the pre-adjustment order.

Here, in the target function for determining the assignment in the post-adjustment order in Expression (5), effects of proportionally dividing the difference between the assigned number xi in the post-adjustment order and the allocated number Pi in the pre-adjustment order based on the assigned number Pi in the pre-adjustment order will be explained. FIG. 9A and FIG. 9B are comparison tables in which a case in which the difference between the assigned number xi in the post-adjustment order and the allocated number Pi in the pre-adjustment order is proportionally divided based on the allocated number Pi in the pre-adjustment order is compared with a case in which the difference between the assigned number xi in the post-adjustment order and the allocated number Pi in the pre-adjustment order is not proportionally divided based on the allocated number Pi in the pre-adjustment order in the target function for determining the assignment in the post-adjustment order. When the allocation of the post-adjustment order is determined, the target function when the difference between the assigned number xi in the post-adjustment order and the allocated number Pi in the pre-adjustment order is not proportionally divided based on the allocated number Pi in the pre-adjustment order is expressed by the following Expression (6).

$$\sum_{i=1}^{N}(p_i - x_i)^2 \tag{6}$$

In the part surrounded by a thick line on the right side of FIG. 9A and FIG. 9B, the results of calculating the allocation in the post-adjustment order based on the target function in Expression (5) and the results of calculating the allocation in the post-adjustment order based on the target function in Expression (6) are shown. As shown in FIG. 9A and FIG. 9B, in the OP specification 4 in the group 2, due to the upper limit of the option 1, the pre-adjustment order P4=100 has been reduced to the post-adjustment order x4=80. The difference, which is 20, needs to be exchanged for the OP specification 3 or 5 in the group 2.

When the calculation is performed based on the target function in Expression (6), the whole difference, which is 20, is exchanged for the OP specification 5 whose assigned number in the pre-adjustment order is larger. Accordingly, in the OP specification 3, the assigned number in the pre-adjustment order P3 is 30, whereas the allocated number in the post-adjustment order x3 becomes 30. In the OP specification 5, the assigned number in the pre-adjustment order P5 is 20, whereas the allocated number in the post-adjustment order x5 becomes 40. Further, "the total absolute value", which indicates the sum total of the absolute values of the deviation of the assigned number in the post-adjustment order from the allocated number in the pre-adjustment order becomes 60.

On the other hand, when the calculation is performed based on the target function in Expression (5), among the difference, which is 20, four is exchanged for the OP specification 3 and 16 is exchanged for the OP specification 5. Accordingly, in the OP specification 3, the allocated number in the pre-adjustment order P3 is 30, whereas the assigned number in the post-adjustment order x3 is 34. In the OP specification 5, the allocated number in the pre-adjustment order P5 is 20, whereas the assigned number in the post-adjustment order x5 is 36. Further, "the total absolute value" becomes 68.

In this way, when the calculation is performed based on the target function in Epression (6), the allocated number in the OP specification for which the number has been exchanged becomes independent from (uncorrelated with) the assigned number in the pre-adjustment order. On the other hand, when the calculation is performed based on the target function in Expression (5), such a deviation of the exchange can be suppressed. That is, when the calculation is performed based on the target function in Expression (5), compared to the case in which the calculation is performed based on the target function in Expression (6), although there are some cases in which the total absolute value becomes somewhat larger, the assigned number in the post-adjustment order is proportionally divided in view of the proportion of the allocated number in the pre-adjustment order, whereby a more optimal solution can be obtained.

From the aforementioned discussion, according to the production management method of this embodiment, the priority order of the constraints is set for each of the options, and the values are determined in order starting from the option whose priority order of the constraints is the highest, whereby it is possible to perform control, for the option whose priority order of the constraints is high, in such a way that the allocated number does not exceed the upper limit. In the calculation of the upper limit exceeding number in the options whose respective priority orders of the constraints are the same, in the options whose respective priority orders of the constraints are the same, the upper limit exceeding number is proportionally divided based on the value of the upper limit of each option, whereby it is possible to level the upper limit exceeding number between the options whose respective priority orders of the constraints are the same. Then the exchange adjustment is further performed for an option having a large margin for the constraints, thereby determining the post-adjustment order. In the calculation in the post-adjustment order, the difference between the assigned number in the post-adjustment order and the allocated number in the pre-adjustment order in each optional specification is proportionally divided by the allocated number in the pre-adjustment order. It is therefore possible to derive more optimal production numbers in which the pre-adjustment order information is taken into account.

Further, in the production management method disclosed in Japanese Unexamined Patent Application Publication No. 2017-068788, when the calculation is performed, the constraints in the options need to be set as a weight of the priority, which is a quantitative criterion, which increases the burden of the user. On the other hand, in the production management method according to this embodiment, the constraints in the options may be set by the priority order, which is a qualitative criterion, which dramatically reduces the burden of the user. Further, since the upper limit exceeding number is determined by performing the optimization calculation in order starting from the option whose priority order of the constraints is high, and then the calculation of the post-adjustment order is performed. In this way, the calculations are performed by a multiple stages. Therefore, there is no need to perform all the calculations again even when the calculation is stopped in the middle of the calculation.

Second Embodiment

A production management system 1 according to a second embodiment is a system for achieving the processing of the production management method according to the first embodiment.

Figure 10:
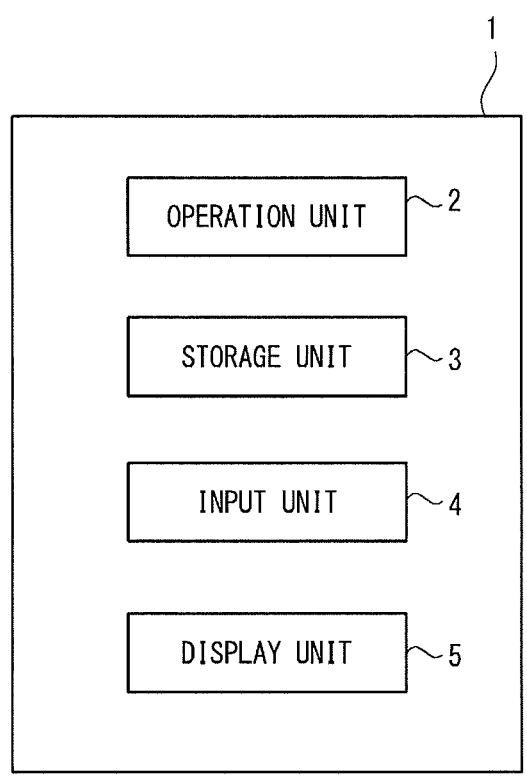
FIG. 10 is a schematic view showing a schematic configuration of a production management system according to a second embodiment.

FIG. 10 is a schematic view showing a schematic configuration of the production management system 1 according to this embodiment. As shown in FIG. 10, the production management system 1 includes an operation unit 2 such as a Central Processing Unit (CPU), a storage unit 3 such as a Read Only Memory (ROM), a Random Access Memory (RAM), and a hard disc, an input unit 4, which is various types of interface, and a display unit 5 such as a display.

In Step S1 of the process flow (see FIG. 1) of the production management method according to the first embodiment, the information regarding the pre-adjustment order, the information regarding the constraints of the options, the correspondence table of the pre-adjustment order with the options, and the information on the priority order of the constraints of the options are each read from the input unit 4. These pieces of information that have been read out are stored in the storage unit 3. In Step S2 of the process flow, the setting of the target function as the quadratic programming problem is performed by the operation unit 2. Further, the optimization calculation of the quadratic programming problem in Steps S3 and S4 of this process flow is performed by the operation unit 2. Then the display unit 5 outputs, in Step S5 of this process flow, the values of the respective options and the assigned numbers in the post-adjustment order calculated in Steps S3 and S4.

From the aforementioned discussion, according to the production management system 1 of this embodiment, it is possible to derive more optimal production numbers in which the pre-adjustment order information is taken into account.

The present disclosure is not limited to the aforementioned embodiments and may be changed as appropriate without departing from the spirit of the present disclosure. While the aforementioned embodiments relate to the production planning for determining assignment of each optional specification in the post-adjustment order under the constraints of the respective options, the target to which the present disclosure is applied is not limited thereto. The present disclosure may be applied, for example, to a distribution plan for allocating how many products should be produced in each line.

While the present disclosure has been described as a hardware configuration in the aforementioned second embodiment, the present disclosure is not limited to this configuration. The present disclosure may achieve each processing by causing a CPU to execute a computer program.

In the aforementioned examples, the aforementioned programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-Recordable (CD-R), CD-Rewritable (CD-R/W), and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A production management method for performing assignment of production numbers of a plurality of optional specifications for a product, which are combination patterns of a plurality of options, using upper limits in the plurality of respective options as constraints, while maintaining a production number in a group included in a large classification, the method comprising:

reading a pre-adjustment order as a desired breakdown of the plurality of optional specifications, constraints for the plurality of respective options, and a priority order of the constraints for the plurality of respective options;

setting, for options whose respective priority orders of the constraints are the same, a target function of a quadratic programming problem for assigning an upper limit exceeding number, which is a number where an allocated number for each option exceeds the upper limit of this option, and setting a target function of a quadratic programming problem for assigning the production numbers of the plurality of optional specifications based on the information that has been read;

performing an optimization calculation of the quadratic programming problem for assigning the upper limit exceeding number in order starting from the one of the plurality of options whose priority order of the constraints is the highest, thereby determining the upper limit exceeding number of this option;

performing, after the whole optimization calculation of the quadratic programming problem for assigning the upper limit exceeding number is completed, an optimization calculation of the quadratic programming problem for assigning the production numbers of the plurality of optional specifications, thereby determining the production numbers of the plurality of respective optional specifications for the product; and producing the product in a production line based on the production numbers of the plurality of respective optional specifications for the product, wherein the target function of the quadratic programming problem for assigning the upper limit exceeding number for each of the options whose respective priority orders of the constraints are the same is a sum total of values obtained by dividing the square of the upper limit exceeding number by an upper limit in the options whose respective priority orders of the constraints are the same, and the target function of the quadratic programming problem for assigning the production numbers of the plurality of optional specifications is a sum total of values obtained by dividing the square of a difference between the assigned production number and the allocated number in the pre-adjustment order in each optional specification by the allocated number in the pre-adjustment order.

2. The production management method of claim 1, wherein the product is an automobile.

3. A production management system for performing assignment of production numbers of a plurality of optional specifications for a product, which are combination patterns of a plurality of options, using upper limits in the plurality of respective options as constraints, while maintaining a production number in a group included in a large classification, the system comprising:

processing circuitry, a storage unit, and an input unit, wherein the input unit reads a pre-adjustment order as a desired breakdown of the plurality of optional specifications, constraints for the plurality of respective options, and a priority order of the constraints for the plurality of respective options and causes the storage unit to store the information that has been read, the processing circuitry sets, for options whose respective priority orders of the constraints are the same, a target function of a quadratic programming problem for assigning an upper limit exceeding number, which is a number where an allocated number for each option exceeds the upper limit of this option, and sets a target function of a quadratic programming problem for assigning the production numbers of the plurality of optional specifications based on the information that has been read, the processing circuitry performs an optimization calculation of the quadratic programming problem for assigning the upper limit exceeding number in order starting from the one of the plurality of options whose priority order of the constraints is the highest, thereby determining the upper limit exceeding number of this option, the processing circuitry performs, after the whole optimization calculation of the quadratic programming problem for assigning the upper limit exceeding number is completed, an optimization calculation of the quadratic programming problem for assigning the production numbers of the plurality of optional specifications, thereby determining the production numbers of the plurality of respective optional specifications for the product, wherein the product is produced in a production line based on the production numbers of the plurality of respective optional specifications for the product, the target function of the quadratic programming problem for assigning the upper limit exceeding number for each of the options whose respective priority orders of the constraints are the same is a sum total of values obtained by dividing the square of the upper limit exceeding number by an upper limit in the options whose respective priority orders of the constraints are the same, and the target function of the quadratic programming problem for assigning the production numbers of the plurality of optional specifications is a sum total of values obtained by dividing the square of a difference between the assigned production number and the allocated number in the pre-adjustment order in each optional specification by the allocated number in the pre-adjustment order.

4. The production management system of claim 3, wherein the product is an automobile.

5. A non-transitory computer readable medium storing a program to be executed by a computer that performs assignment of production numbers of a plurality of optional specifications for a product, which are combination patterns of a plurality of options, using upper limits in the plurality of respective options as constraints, while maintaining a production number in a group included in a large classification, the program comprising:

reading a pre-adjustment order as a desired breakdown of the plurality of optional specifications, constraints for the plurality of respective options, and a priority order of the constraints for the plurality of respective options;

setting, for options whose respective priority orders of the constraints are the same, a target function of a quadratic programming problem for assigning an upper limit exceeding number, which is a number where an allocated number for each option exceeds the upper limit of this option, and setting a target function of a quadratic programming problem for assigning the production numbers of the plurality of optional specifications based on the information that has been read;

performing an optimization calculation of the quadratic programming problem for assigning the upper limit exceeding number in order starting from the one of the plurality of options whose priority order of the constraints is the highest, thereby determining the upper limit exceeding number of this option; and performing, after the whole optimization calculation of the quadratic programming problem for assigning the upper limit exceeding number is completed, an optimization calculation of the quadratic programming problem for assigning the production numbers of the plurality of optional specifications, thereby determining the production numbers of the plurality of respective optional specifications for the product, wherein the product is produced in a production line based on the production numbers of the plurality of respective optional specifications for the product, the target function of the quadratic programming problem for assigning the upper limit exceeding number for each of the options whose respective priority orders of the constraints are the same is a sum total of values obtained by dividing the square of the upper limit exceeding number by an upper limit in the options whose respective priority orders of the constraints are the same, and the target function of the quadratic programming problem for assigning the production numbers of the plurality of optional specifications is a sum total of values obtained by dividing the square of a difference between the assigned production number and the allocated number in the pre-adjustment order in each optional specification by the allocated number in the pre-adjustment order.

6. The non-transitory computer readable medium of claim 5, wherein the product is an automobile.

\* \* \* \* \*